US008677336B2

(12) United States Patent
Richins (10) Patent No.: US 8,677,336 B2
(45) Date of Patent: Mar. 18, 2014

(54) BLOCK COUNT BASED PROCEDURE LAYOUT AND SPLITTING

(75) Inventor: Grant A. Richins, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1312 days.

(21) Appl. No.: 12/016,099

(22) Filed: Jan. 17, 2008

(65) Prior Publication Data

US 2009/0187887 A1    Jul. 23, 2009

(51) Int. Cl.
*G06F 9/44* (2006.01)

(52) U.S. Cl.
USPC .......................................... 717/151; 717/120

(58) Field of Classification Search
USPC ................................. 717/120, 151
See application file for complete search history.

(56) References Cited

U.S. PATENT DOCUMENTS

| 5,212,794 | A | * | 5/1993 | Pettis et al. ................... 717/153 |
| 5,768,592 | A | | 6/1998 | Chang |
| 5,778,232 | A | | 7/1998 | Caldwell et al. |
| 5,950,009 | A | | 9/1999 | Bortnikov et al. |
| 5,963,740 | A | | 10/1999 | Srivastava et al. |
| 5,999,738 | A | | 12/1999 | Schlansker |
| 6,006,033 | A | | 12/1999 | Heisch |
| 6,101,595 | A | | 8/2000 | Pickett et al. |
| 6,305,010 | B2 | * | 10/2001 | Agarwal ........................ 717/126 |
| 6,481,008 | B1 | | 11/2002 | Chaiken et al. |
| 7,100,157 | B2 | | 8/2006 | Collard |
| 7,155,708 | B2 | | 12/2006 | Hammes |
| 2004/0199904 | A1 | | 10/2004 | Schmidt |
| 2005/0044538 | A1 | * | 2/2005 | Mantripragada ............. 717/151 |
| 2006/0236309 | A1 | | 10/2006 | George |
| 2007/0261039 | A1 | | 11/2007 | Sargaison |

OTHER PUBLICATIONS

Ramirez, Alex, et al., "Code Layout Optimizations for Transaction Processing Workloads", 2001 IEEE, 10 pages.
Tamches, Ariel, et al., "Dynamic Kernel Code Optimization", 2001, 10 pages.
Tamaches, Ariel, "Fine-Grained Dynamic Instrumentation of Commodity Operating System Kernels", A dissertation submitted in partial fulfillment of the requirements for the degree of Doctor of Philosophy (Computer Sciences) at the University of Wisconsin-Madison, 2001, 154 pages.
Pettis, Karl, et al., "Profile Guided Code Positioning" 1990 ACM, pp. 16-27.

* cited by examiner

*Primary Examiner* — Wei Zhen
*Assistant Examiner* — Mohammed Huda
(74) *Attorney, Agent, or Firm* — Brian Haslam; Kevin Sullivan; Micky Minhas (57) ABSTRACT

The present invention extends to methods, systems, and computer program products for block count based procedure layout and splitting. Embodiments of the invention utilize code block counts to provide a total ordering of code blocks that improves execution time of generated procedure code by minimizing branches along more frequently executed paths. The total ordering is optimized using prioritized precedence relationships. For example, the total ordering is optimized to maximize the appropriate placement of code block chains after other code block chains. The total ordering is also optimized to place zero count (untouched) code blocks after any non-zero (touched) code blocks.

13 Claims, 6 Drawing Sheets

FIG. 2C
(Without Transitive Closure)

FIG. 2D
(With Transitive Closure)

BLOCK COUNT BASED PROCEDURE LAYOUT AND SPLITTING

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

As computerized systems have increased in popularity, so have the complexity of the software and hardware employed within such systems. In general, the need for seemingly more complex software continues to grow, which further tends to be one of the forces that push greater development of hardware. However, even for complex software some paths through the code may be traveled relatively (and potentially significantly) more frequently during execution. Conversely, other paths through the code may be traveled relatively infrequently or not traveled at all. Software code can include various conditional or other branching statements that result in a particular code path being traveled during execution.

Unfortunately, when software code is executed, placement of individual code blocks in memory may not account for more or less frequently traveled paths. That is, relatively infrequently executed code blocks can be placed before more frequently executed code blocks causing execution to jump between non contiguous portions of memory.

Further, typical processors have a natural preference for where to look for a next instruction when encountering a conditional branch. For example, many processors have algorithms for identifying the next instruction to execute upon reaching a conditional branch. These algorithms typically include various assumptions and/or predictions on how instructions are typically executed. For example, many such algorithms assume that if a conditional branch is forward (i.e., to a code block placed after the current code block in system memory) that the branch is not to be taken. On the other hand, these algorithms can also assume that if a branch is backwards (i.e., to a code block placed before the current code block in system memory) that the branch is to be taken.

However, regardless of where the code blocks are placed, the algorithm must place appropriate branches (condition or unconditional) to guarantee that the code blocks are executed in an appropriate order. Unfortunately, compilers often fail to consider processor algorithm functionality when arranging code blocks within executable code. For example, compilers can output executable code that essentially parallels the arrangement of instructions in the source code. This compiler functionality can lead to less than optimal execution. For example, executable code can include forward branches to frequently utilized code blocks and/or backward branches to less frequently utilized code.

As a result some mechanisms attempt to optimize code block layout. These mechanisms typically instrument code with probes to determine how often one code block is called from other code blocks (commonly referred to as "arc counts") Based on the arc counts, the code blocks are ordered for more efficient execution. Some further mechanisms instrument code to calculate how many times a code block is actually executed (commonly referred to as "block counts"). However, these mechanisms typically use greedy algorithms that place code blocks from the local perspective of the code blocks. This results in more efficient operation of some code blocks, but possible sacrifices of the overall efficiency of a method or other larger portion of code.

Further, calculation of block counts does not necessarily provide an accurate representation of how many times particular arcs were taken. That is, an indication of code block execution for a code block does not necessarily indicate which other code block was executed before or after the code block. Further, it may be difficult to gather accurate arc counts when code blocks call themselves recursively.

Nonetheless, some mechanisms gather block counts and attempt to compute accurate arc counts. However, it is very difficult if not impossible to derive accurate arc counts from block counts for all possible combinations of blocks and arcs. As such, computing arc counts using these mechanisms are either approximations or have some degree of inaccuracy.

BRIEF SUMMARY

The present invention extends to methods, systems, and computer program products for block count based procedure layout and splitting. A computer system accesses executable procedure that includes a plurality of different code blocks. The executable procedure has a starting code block and one or more conditional statements that separate execution of the procedure into other code blocks. The computer system accesses block count data for the executable procedure. The block count data includes a block count for each code block indicating how many times the code block was executed during one or more prior executions of the executable procedure. The computer system creates one or more code block chains of one or more code blocks for the executable procedure based on the accessed block count.

In some embodiments, code block chain creation for each of the one or more code block chains includes accessing a code block with the highest block count that is not already included in code block chain. For each accessed code block, it is determined if the accessed code block is a successor to the last code block in an existing chain. For each accessed code block, it is also determined if the accessed code block is a predecessor to the first code block in an existing chain. The accessed code block is assigned to the one or more code block chains based on the results of determining if the accessed block is a successor and/or predecessor. Assigning a code block to the one or more code block chains can include: A) creating a new code block chain and assigning the accessed code block to the new code block chain or B) assigning the accessed code block to an existing code block chain. When appropriate, two existing code block chains can also be merged into a single code block chain. For example, when a code block is a predecessor to one code block chain and a successor to another code block chain.

In other embodiments, at least an after set (and possibly also a before set) of chains is collected for each code block chain. For a specified code block chain, an after set indicates a preference that the specified code block chain succeeds a set of other code block chains within an ordering of the one or more code block chains. For a specified code block chain, a before set of chains indicates a preference that the specified code block chain precede a set of the other code block chains within an ordering of the one or more code block chains.

The computer system orders the one or more code block chains for placement into system memory to optimize subsequent execution of the executable procedure. Ordering code block chains can include creating an ordering for any non-zero count code block chains including connecting any non-zero count code block chains to one another in accordance with precedence relationships. Ordering code block chains can also include creating an ordering for any zero count code block chains including connecting any zero count code block chains to one another in accordance with precedence relationships. Ordering code block chains can include subsequently appending the ordering of zero count code block chains to the end of the ordering of non-zero count code block chains to create a total ordering for the one or more code block chains. Accordingly, any non-zero count blocks are placed before all zero count blocks within system memory when the total ordering is placed into system memory.

Code block chain ordering can be based on precedence relationships. Precedence relationships can include giving priority to an ordering that minimizes after set violations.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for block count based procedure layout and splitting. A computer system accesses executable procedure that includes a plurality of different code blocks. The executable procedure has a starting code block and one or more conditional statements that separate execution of the procedure into other code blocks. The computer system accesses block count data for the executable procedure. The block count data includes a block count for each code block indicating how many times the code block was executed during one or more prior executions of the executable procedure. The computer system creates one or more code block chains of one or more code blocks for the executable procedure based on the accessed block count.

In some embodiments, code block chain creation for each of the one or more code block chains includes accessing a code block with the highest block count that is not already included in code block chain. For each accessed code block, it is determined if the accessed code block is a successor to the last code block in an existing chain. For each accessed code block, it is also determined if the accessed code block is a predecessor to the first code block in an existing chain. The accessed code block is assigned to the one or more code block chains based on the results of determining if the accessed block is a successor and/or predecessor. Assigning a code block to the one or more code block chains can include: A) creating a new code block chain and assigning the accessed code block to the new code block chain or B) assigning the accessed code block to an existing code block chain. When appropriate, two existing code block chains can also be merged into a single code block chain. For example, when a code block is a predecessor to one code block chain and a successor to another code block chain.

In other embodiments, at least an after set (and possibly also a before set) of chains is collected for each code block chain. For a specified code block chain, an after set indicates a preference that the specified code block chain succeeds a set of other code block chains within an ordering of the one or more code block chains. For a specified code block chain, a before set of chains indicates a preference that the specified code block chain precede a set of the other code block chains within an ordering of the one or more code block chains.

The computer system orders the one or more code block chains for placement into system memory to optimize subsequent execution of the executable procedure. Ordering code block chains can include creating an ordering for any non-zero count code block chains including connecting any non-zero count code block chains to one another in accordance with precedence relationships. Ordering code block chains can also include creating an ordering for any zero count code block chains including connecting any zero count code block chains to one another in accordance with precedence relationships. Ordering code block chains can include subsequently appending the ordering of zero count code block chains to the end of the ordering of non-zero count code block chains to create a total ordering for the one or more code block chains. Accordingly, any non-zero count blocks are placed before all zero count blocks within system memory when the total ordering is placed into system memory.

Code block chain ordering can be based on precedence relationships. Precedence relationships can include giving priority to an ordering that minimizes after set violations.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
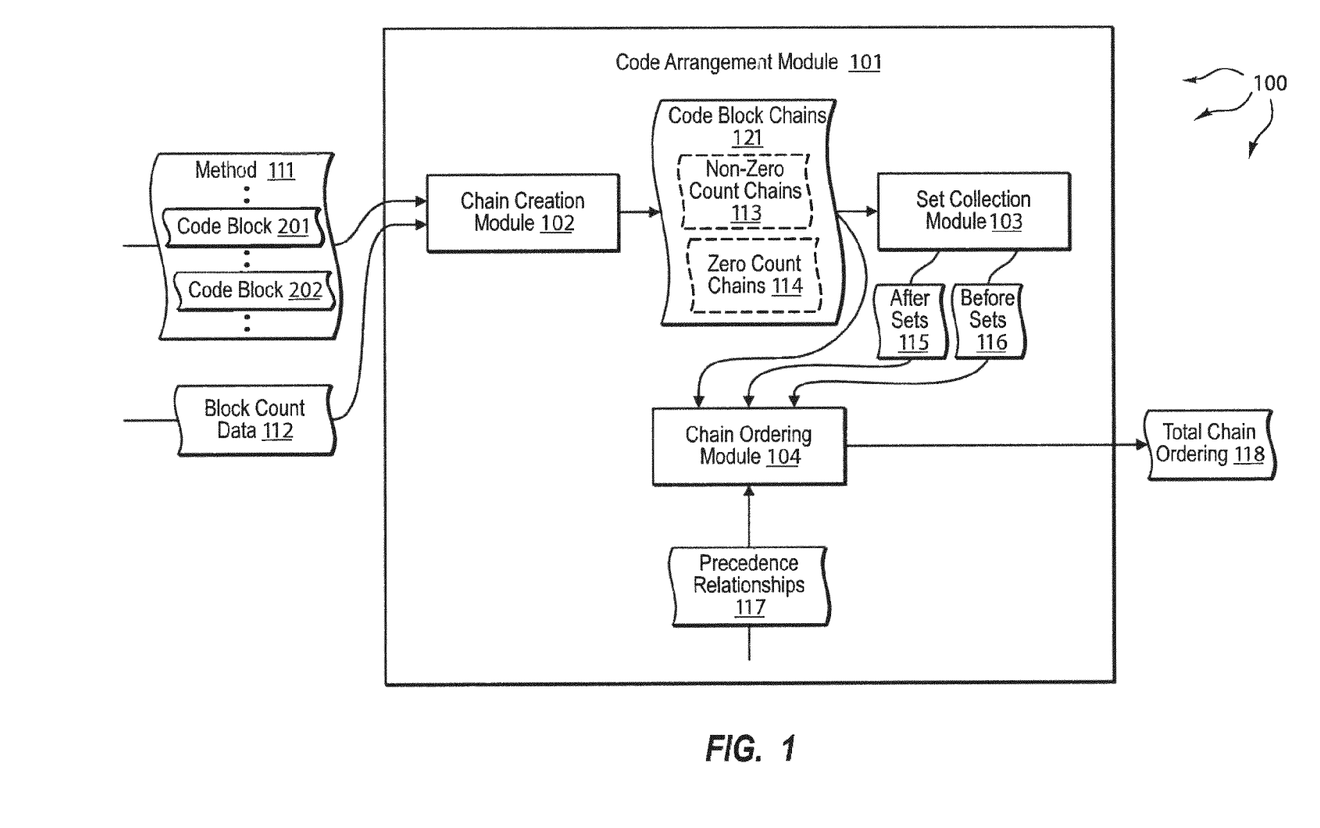
FIG. 1 illustrates an example computer architecture that facilitates for block count based procedure layout and splitting.

FIG. 1 illustrates an example computer architecture 100 that facilitates block count based procedure layout and splitting. Referring to FIG. 1, computer architecture 100 includes code arrangement module. Generally, code arrangement module 101 is configured to receive an executable procedure and block count data for the executable procedure. From the block count data, code arrangement module 101 optimizes the arrangement of code blocks within the executable procedure for placement in system memory. Optimization can include positioning code blocks for more efficient execution, reducing memory overhead, etc.

As depicted, code arrangement module 101 includes chain creation module 102, set collection module 103, and chain ordering module 104. Each of the depicted components can be connected to one another over a system bus and/or over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, chain creation module 102 is configured to receive an executable procedure and block count data, such as, for example, method 111 including code blocks 201, 202, etc. (e.g., portions of a larger software application) and block count data 112. Executable procedures can include conditional and other statements that cause various different code block paths to be taken during execution. Block count data is data indicating how many times each code block was executed during previous (e.g., non-optimized) executions of the procedure.

An executable procedure can be profiled to generate block count data. For example, code blocks can be instrumented with probes that count each time the code block is executed. Subsequently, the instrumented executable procedure can be executed a number times using varied input values. For each execution, probes can increment the block count for a code block if the code block is executed. Thus, block count data can be accumulated over a number of prior executions using varied input values. Each time a code block is executed during a prior execution, the block count for the code block can be incremented. However, the number of times a specific code block is executed may have limited, if any, correspondence to the actual number of times the executable procedure was executed during profiling. Other profile guided data can be also generated and used.

Figure 2A:
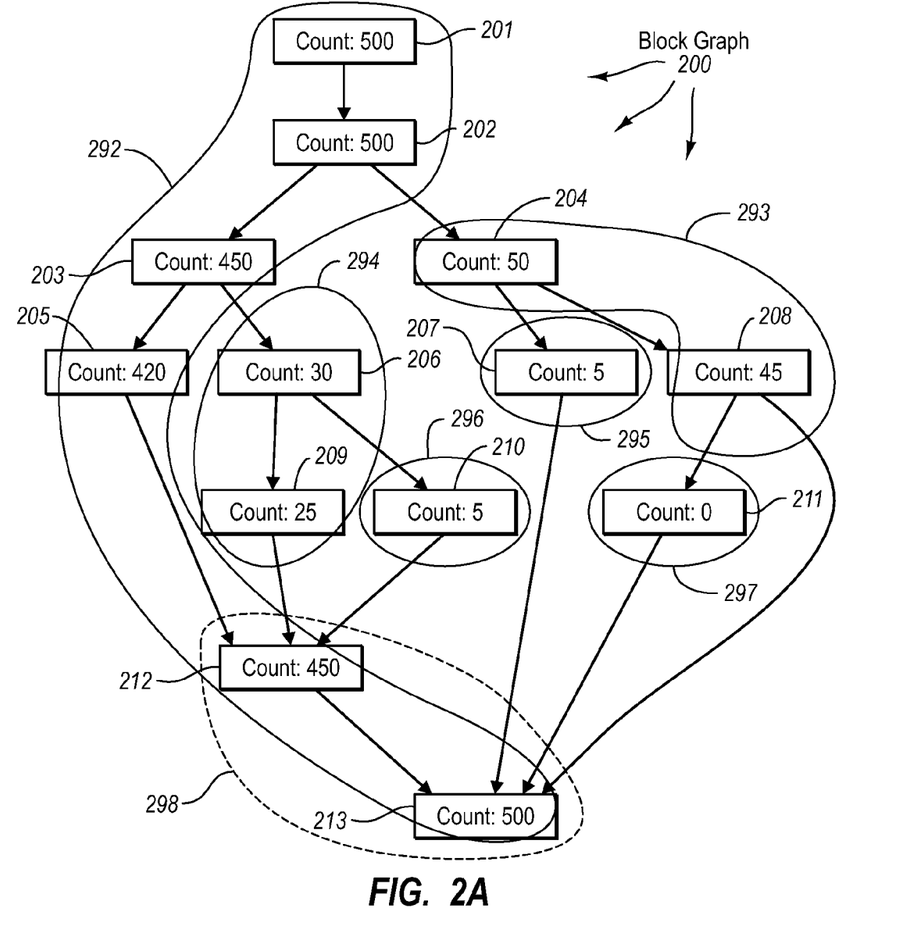
FIG. 2A illustrates an example block graph for an executable procedure.

Thus, from an executable procedure and block count data, chain creation module 102 can formulate a block graph for the executable procedure. For example, as depicted in FIG. 2A, chain creation module 102 can formulate block graph 200 for method 111. Block graph 200 indicates the relative position of code blocks 201 through 213 to one another and a "count" of how many times each code block was executed during profiling. The "count" values indicate how many times a corresponding probe detected that its corresponding code block was executed. Accordingly, it may be that chain creation module 102 formulates block graph 200 from method 111 and block count data 112 to facilitate subsequent identification of code block chains within method 111.

From a block graph, chain creation module 102 can identify one or more code block chains, such as, for example, code block chains 121. A code block chain includes one more connected code blocks (i.e., a chain of code blocks) are to be grouped together to optimize placement of the executable procedure in system memory. Generally, chain creation module 102 attempts to chain code blocks with higher counts together (so that higher count code blocks are close together in system memory). Chain creation module 102 can follow a path between various adjacent higher count code blocks until reaching the end of a block graph or until no further adjacent code blocks are available (e.g., the next adjacent code block has already been included in another code block chain or is a zero count code block).

Figure 2B:
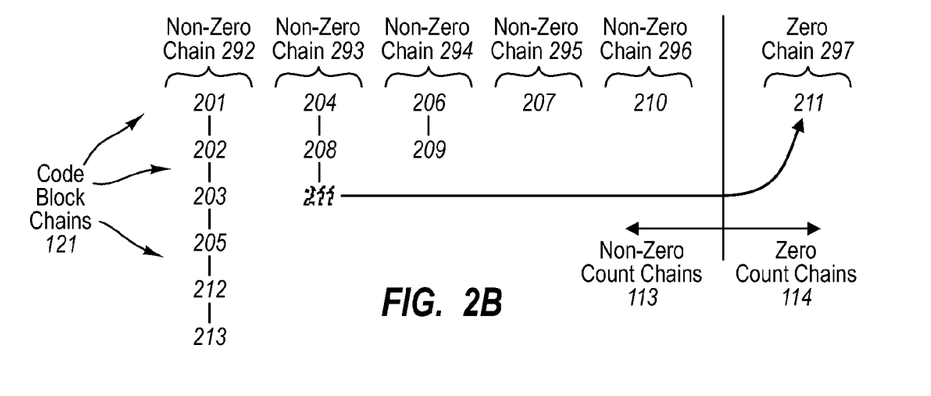
FIG. 2B illustrates chains of code blocks from the block graph of FIG. 2A.

FIG. 2B depicts an example of code block chains 121 indentified from code blocks in block graph 200. Code block 201 has the highest count and was before any other blocks with the same count in the original executable code order, so the algorithm selects it first. Since there are no chains to add it to, it is added to a new empty chain 292. Code block 202 has the next highest count. Because it is the successor to the last block 201 of chain 292, it is appended to chain 292.

Code block 213 has the next highest count. It is not the successor or predecessor of any blocks in any existing chains, and so it is added to a new (and ultimately temporary) chain 298. Next, similar to code block 202, code block 203 is appended to chain 292. Code block 212 is selected next because it has the highest count of the remaining blocks. Because it is the predecessor of code block 213, the first block of chain 298, it is appended to the start of chain 298. Next code block 205 is selected. It is the successor to chain 292 and the predecessor to chain 298, so code block 205 is appended to chain 292 and then the blocks of chain 298 are appended and chain 298 is discarded.

Code block 204 is not a successor to the last block of any chain (only chain 292 at this point) or the predecessor to the first block of any chain, so it is added to a new chain 293. Next code block 208 is appended to chain 293 because it is the successor to the last code block of that chain, code block 204. Similar to code block 204, code block 206 becomes part of a new chain 294, then code block 209 is added to chain 294. Code blocks 207 and 210 cannot be added to any existing chains and so they form new chains 295 and 296 respectively. The last code block to process is code block 211. It is the successor to the last block of chain 293, code block 208, but that chain contains non-zero count blocks and code block 211 has a count of zero, so it can only be added to chains with zero count blocks. Since none exist, it is added to a new chain 297.

Figure 2C:
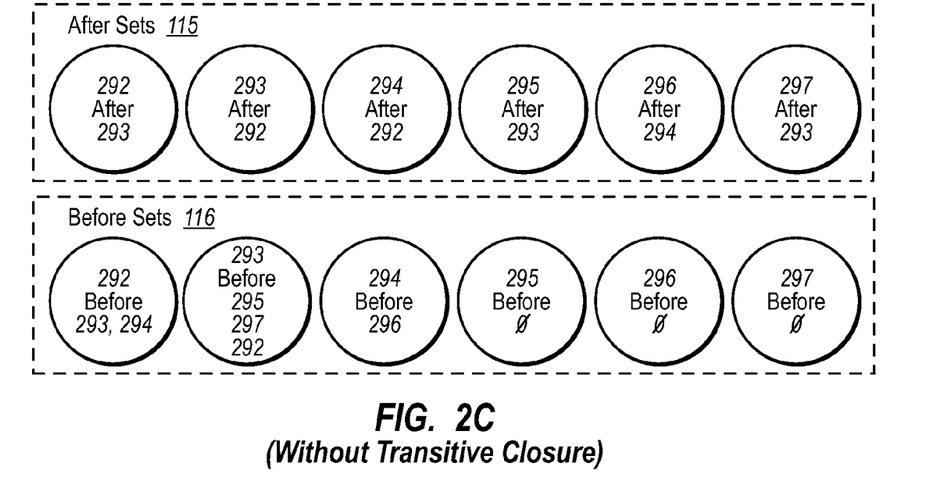
FIG. 2C illustrates after sets and before sets for the chains of code blocks from FIG. 2B without transitive closure FIG. 2D after sets and before sets for the chains of code blocks from FIG. 2B with transitive closure
Figure 2D:
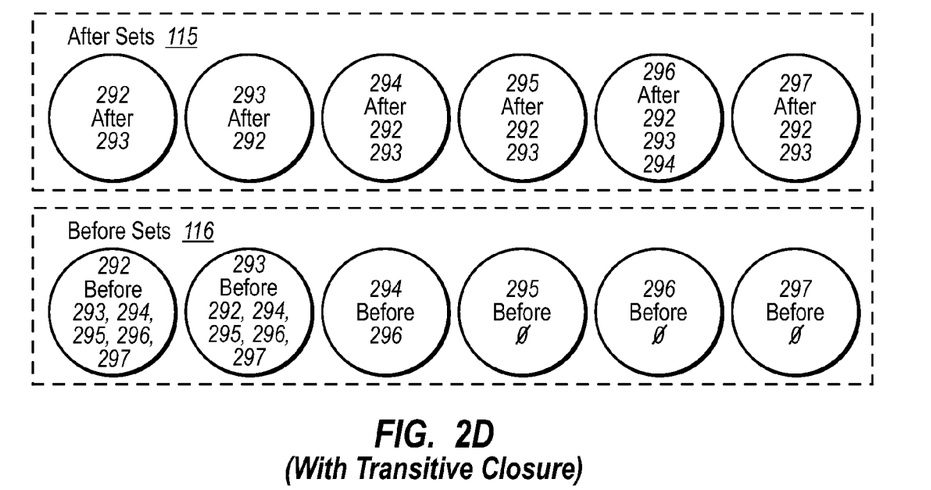

Set collection module 103 is configured to receive code block chains, such as, for example, code block chains 121. From the code block chains, set collection module can create after sets and before sets for each chain in the code block chains, such as, for example, after sets 115 and before sets 116. An after set for a specified code block chain indicates a preference that the specified code block chain comes after the code block chains in the after set in a total ordering of chains. A before set for a specified code block chain indicates a preference that the specified code block chain come before the code block chains in the before set in a total ordering of chains. FIG. 2C depicts example after sets 115 and before sets 116 for code block chains 121 without transitive closure. FIG. 2D depicts example after sets 115 and before sets 116 for code block chains 121 with transitive closure.

Figure 2E:
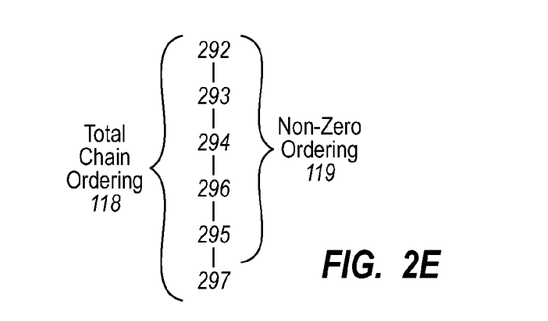
FIG. 2E illustrates a total chain ordering for the chains of code blocks from FIG. 2B.

Chain ordering module 104 is configured to receive code block chains, any after sets and before sets, and precedence relationships, such as, for example, code block chains 121, after sets 115 and before sets 116, and precedence relationships 117 respectively. From code block chains, any after sets and before sets, and precedence relationships, chain ordering module 104, can create a total ordering of code block chains, such as, for example, total chain ordering 118, for an executable procedure. The total chain ordering can be optimized for placement in system memory. FIG. 2E depicts a more detailed representation of total chain ordering 118 for code block chains 121.

Figure 3:
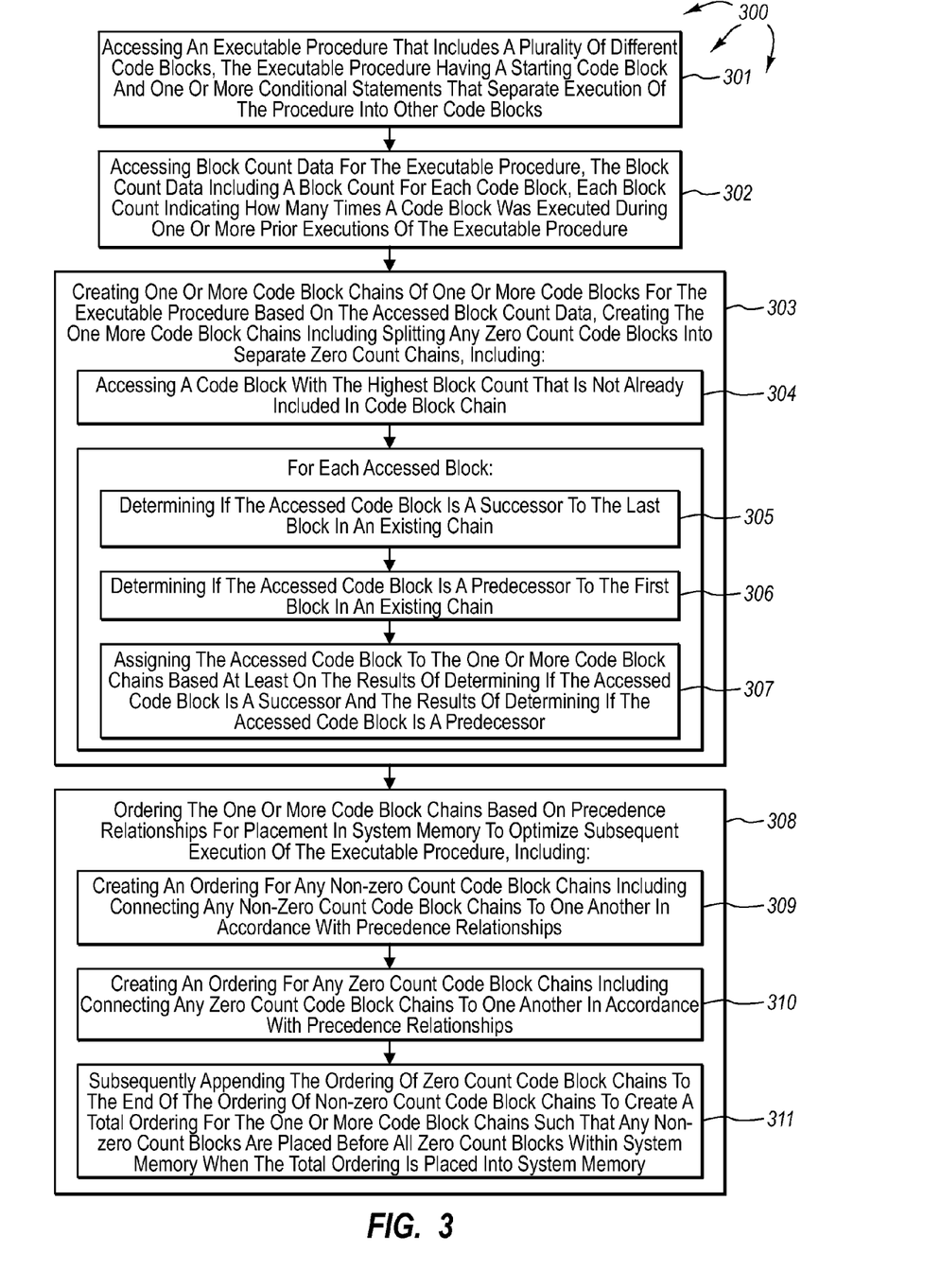
FIG. 3 illustrates a flow chart of an example method for optimizing the execution of a software procedure.

FIG. 3 illustrates a flow chart of an example method 300 for block count based procedure layout and splitting. Method 300 will be described with respect to the components and data in computer architecture 100, block graph 200, code block chains 121 and total chain ordering 118.

Method 300 includes an act of accessing an executable procedure that includes a plurality of different code blocks, the executable procedure having a starting code block and one or more conditional statements that separate execution of the procedure into other code blocks (act 301). For example, chain creation module 102 can access method 111. Method 300 includes an act of accessing block count data for the executable procedure, the block count data including a block count for each code block, each block count indicating how many times a code block was executed during one or more prior executions of the executable procedure (act 302). For example, chain creation module 102 can access block count data 112.

Method 300 includes an act of creating one or more chains of one or more code blocks for the executable procedure based on the accessed block count data (act 303). For example, chain creation module 102 can create code block chains 121 based on block count data 112. In some embodiments, code block chains are created simultaneously.

Chain creation for the one or more code block chains includes an act of accessing a code block with the highest block count that is not already included in a code block chain (act 304). For example, at the outset chain creation module 102 can access code block 201. If code block 201 is already included in a chain, chain creation module 102 can access block 202. Next, chain creation module 102 can access blocks, 213, 203, 212, 205, 204, 208, 206, 209, 207, 210, and 211 in that order. However, the ordering of blocks with the same block count (e.g., 201, 202, and 213, 203 and 212, and 207 and 210) can be varied.

The location of a code block within block graph 200 may or may not be taken into consideration. For example, when code blocks have identical block counts, the code block closer to the top of block graph 200 can be processed first. However, other than for ordering the processing of code blocks with identical block counts, location of a code block within block graph 200 has limited, if any, impact on the order code blocks are processed for inclusion in code block chains. For example, code block 213 can be processed before code block 203, even though code block 213 is below code bock 203 in block graph 200.

For each accessed block, method 300 includes an act of determining if the accessed block is a successor to the last block in an existing code block chain (act 305). For example, upon accessing code block 201, chain creation module 102 can determine that block 201 is not a successor to the last block in an existing chain (since there are not yet any chains).

For each accessed block, method 300 includes an act of determining if the accessed block is a predecessor to the first block in an existing code block chain (act 306). For example, upon accessing block 201, chain creation module 102 can determined that block 201 is not a predecessor to the first block in an existing chain (since there are not yet any chains).

For each accessed block, method 300 includes an act of assigning the accessed code block to the one or more code block chains based at least on the results of determining if the accessed code block is a successor and/or predecessor (act 307). Assigning a code block to the one or more code block chains can include creating a new chain for a code block and/or assigning (e.g., appending or prepending) a code block to an existing chain. For example, since code block 201 is neither a successor nor a predecessor of an existing chain, a new chain 292 is created. Code block 201 is assigned to chain 292.

Acts 305, 306, and 307 can be repeated for each accessed code block. For example, after processing code block 201, chain creation module 102 can process code block 202. Chain creation module 102 can determine that code block 202 is a successor to code block 201 (the last code block in chain 292) and is not a predecessor to the first block in an existing chain. Thus, code block 202 is appended to chain 292.

Assigning code blocks to code block chains can also include merging code block chains. For example, subsequent to processing code block 201, chain creation module 102 can process code block 213. Code block 213 is neither a successor nor a predecessor to an existing chain. Since code block 201 is neither a successor nor a predecessor of an existing chain, a new chain 298 is created. Code block 213 is assigned to chain 298.

Subsequent to processing code block 213, chain creation module 102 can process code block 203 and append code block 202 to chain 292. Subsequent to processing code block 203, chain creation module 102 can process code block 212 and prepend code block 212 to chain 298.

Subsequent to processing code block 212, chain creation module 102 can process code block 205. Chain creation module 102 can determine that code block 205 is both a successor to the last code block (code block 203) in chain 292 and a predecessor to the first code block (code block 212) in chain 298. As such, code block 205 is appended to chain 292 or prepended to chain 298. Subsequently, chains 292 and 298 are merged resulting in a single chain (as depicted in FIG. 2A chain 292 is retained and chain 298 is discarded, however the inverse can also occur).

Code block chain creation can include separating chains of non-zero count code blocks from chains of zero count code blocks. Accordingly, method 300 can also include an act of, prior to assigning a code block to a code block chain, determining if a code block is a zero or non-zero count code block. As such, assigning an accessed code block to the one or more code block chains can include determining if a zero count block is a predecessor or successor to a non-zero block in an existing code block chain. Thus, even when a zero count block is a predecessor or successor of a non-zero count block, a new chain is created and the zero count block is assigned to the new chains. For example, upon processing code block 211 it can be determined that code block 211 is a successor to the last code block (code block 208) in code block chain 293. However, since code block 211 is a zero count code block, a new code block chain 297 is created. Code block 211 is assigned to code block chain 297 instead of code block chain 293.

Chain creation module 102 can send code block chains 121, including non-zero count chains 113 (e.g., non-zero chains 292, 293, 294, 295, and 296) and zero count chains 114 (e.g., zero chain 297), to set collection module 103 and/or to chain ordering module 104.

Method 300 includes an act of ordering the one or more code block chains based on precedence relationships for placement in system memory to optimize subsequent execution of the executable procedure (act 308). For example, chain ordering module 104 can order code block chains 121 based on precedence relationships 117 for placement into system memory to optimize execution of method 111. Precedence relationships 117 can indicate that non-zero chains are to be ordered before zero chains.

Accordingly, ordering the one or more code block chains can include an act of creating an ordering for any non-zero count code block chains including connecting any non-zero count code block chains to one another in accordance with precedence relationships (act 309). For example, referring to FIG. 2E, chain ordering module 104 can create non-zero ordering 119 for non-zero chains 292 through 296, including connecting non-zero chains 292 thorough 296 to one another in accordance with precedence relationships 117.

Ordering the one or more code block chains can also include an act of creating an ordering for any zero count code block chains including connecting any zero count code block chains to one another in accordance with precedence relationships (act 310). For example, although not expressly depicted other zero count code block chains can be connected to zero chain 297, in accordance with precedence relationships 117.

Ordering the one or more code block chains can also include an act of appending any zero count code block chains to the end of the ordering of non-zero count code block chains to create a total ordering for the one or more code block chains such that any non-zero count blocks are placed before all zero count blocks within system memory when the total ordering is placed into system memory (act 311). For example, chain ordering module 104 can append zero chain 297 to the end of non-zero ordering 119 to create total chain ordering 118.

Accordingly, when total chain ordering 118 is placed into system memory, any non-zero count blocks (i.e., 292-296) are placed before all zero count blocks (i.e., 297). Placing non-zero count blocks before zero count blocks in system memory optimizes execution of method 111. During execution, non-zero blocks are grouped together significantly reducing the likelihood of a transition between non-zero blocks having to skip over any zero blocks in memory. Further, in some embodiments, zero count blocks are not even loaded into memory.

Figure 4:
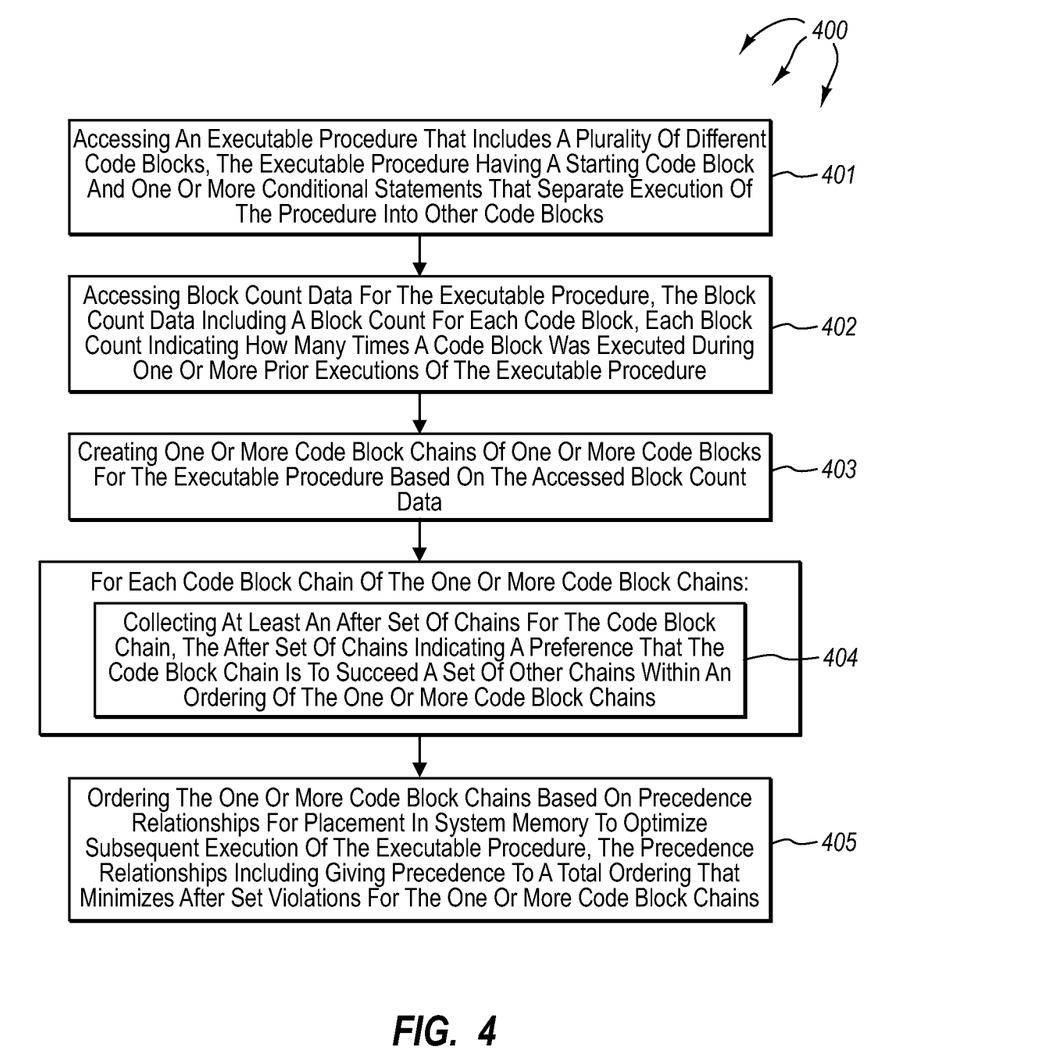
FIG. 4 illustrates a flow chart of an example method for optimizing the execution of a software procedure.

FIG. 4 illustrates a flow chart of an example method 400 for block count based procedure layout and splitting. Method 400 will be described with respect to the components and data in computer architecture 100, block graph 200, code block chains 121, after sets 115, before sets 116, and total chain ordering 118.

Method 400 includes an act of accessing an executable procedure that includes a plurality of different code blocks, the executable procedure having a starting code block and one or more conditional statements that separate execution of the procedure into other code blocks (act 401). Method 400 includes an act of accessing block count data for the executable procedure, the block count data including a block count for each code block, each block count indicating how many times a code block was executed during one or more prior executions of the executable procedure (act 402). For example, as previously described, chain creation module 102 can access method 111 and block count data 112.

Method 400 includes an act of creating one or more chains of one or more code blocks for the executable procedure based on the accessed block count data (act 403). For example, also as previously described, chain creation module 102 can create code block chains 121 based on block count data 112.

For each code block chain of the one or more code block chains, method 400 includes an act of collecting at least an after set of chains for the code block chain, the after set of chains indicating a preference that the chain is to succeed a set of other chains within an ordering of the one or more code block chains (act 404). For example, set collection module 103 can collect after sets 115 for code block chains 121. An after set for a specified chain indicates a preference that the chain succeeds a set of other chains. When viewed together, a plurality of after sets expresses preferences for a total ordering of chains. Thus although specified after sets indicate opposing preferences, a total ordering based on one of more expressed preferences can still be generated.

For example, after sets 115 indicate that it is preferred in a total ordering of chains that chain 293 come after chain 292 and also that chain 292 come after chain 293. However, a total ordering satisfying either preference likely reduces the overall number of unconditional branches, assists in prediction of remaining conditional branches, and places frequently executed code blocks closer together. Thus, although the preferences are in opposition satisfying either preference provides more efficient execution of method 111.

Likewise, set collection module 103 can collect before sets 116. A before set for a specified chain indicates a preference that the chain precede a set of other chains. When viewed together, a plurality of before sets also expresses preferences for a total ordering of chains. Thus, similar to after sets, although specified before sets can indicate opposing preferences, a total ordering based on one of more expressed preferences can still be generated.

Collection of before and after sets can be based on the position of code blocks within one chain relative to the position of code blocks within another chain in block graph 200. For example, non-zero chain 294 preferably comes before non-zero chain 296, in a total ordering, resulting in a forward branch from non-zero chain 294 to non-zero chain 296. Arranging non-zero chain 294 before non-zero chain 296 can optimize execution. That is, for example, since a processor may assume/predict that forward branches are not to be taken, the least traveled branch out of code block 206 is indicated as a forward branch.

Various precedence relationships can use before sets and after sets as input to determine how to order code block chains relative to one another. In some embodiments, the code block chain that contains the entry block (or start of the executable code), is given the highest priority and is thus added as the first sorted chain. Next, each chain with the highest priority is added to the sorted list of chains. Priorities of unsorted chains can change as other chains are added to the list of sorted chains.

For example, method 400 includes act of ordering the one or more code block chains based on precedence relationships for placement in system memory to optimize subsequent execution of the executable procedure, the precedence relationships including giving priority to a total ordering that minimizes after set violations for the one or more code block chains (act 405). For example, chain ordering module 104 can order code block chains 121, based on precedence relationships 117, for placement in system memory to optimize subsequent execution of method 111. Precedence relationships 117 can indicate one or more prioritized precedence relationships. A higher priority precedence relationship in precedence relationship 117 can be minimizing after set violations. For example, placing non-zero chain 295 before non-zero chain 293 violates after sets 115. Thus, chain ordering module 104 attempts to place non-zero chain 295 after non-zero chain 293 in total chain ordering 118.

Figure 5:
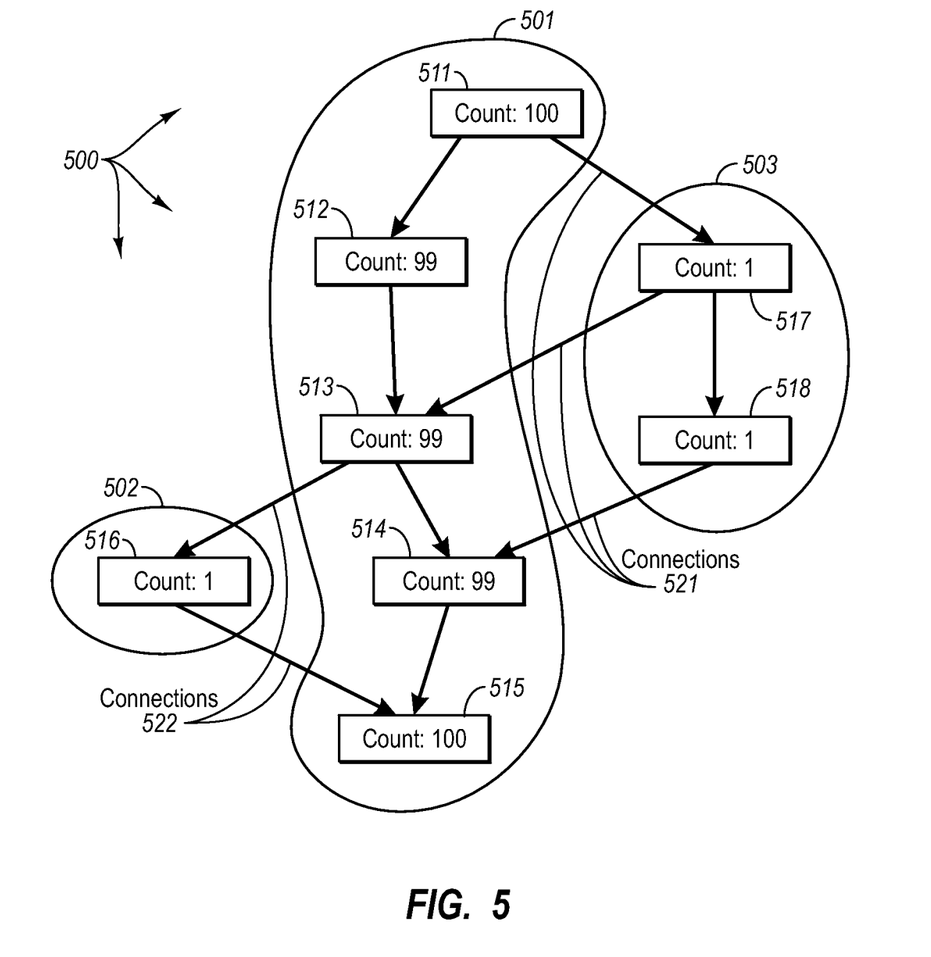
FIG. 5 illustrates an example of connections between code blocks chains.

When after set violations for a plurality of code block chains would be the same relative to all other unsorted code block chains, a next lower priority precedence relationship can be maximizing count connections to and/or from previously sorted code block chains. FIG. 5 illustrates an example of connections 500 between code blocks chains.

As depicted, chain 501 includes code blocks 511, 512, 513, 514, and 515. Chain 502 includes code block 516 and chain 503 includes code blocks 517 and 518. Connections 521 represent that there are three connections between chain 501 and 503. Similarly, connections 522 represent that there are two connections between chain 501 and 502. After set violations when placing either of chain 502 or 503 after chain 501 would be the same relative to other unsorted code block chains. Thus, the next chain is placed to maximize connections to and from chain 501 (the previously sorted code block). Accordingly, since connections 521 represents three connections and connections 522 represents two connections, code block chain 503 is placed after code block chain 501 and before chain 502 in a total ordering of chains 501, 502, and 503.

When the after set violations and connection counts for a plurality of code block chains are the same relative to all other unsorted code block chains, a next lower priority precedence relationship can be maximizing the set of code block chains that should be after previously sorted code block chains but that are not yet sorted. For example, after placement of non-zero chain 293, either of non-zero chains 295 and 294 can be placed without any after set violations. Further, each of non-zero chains 295 and 294 has two connections to the previously sorted non-zero chains 292 and 293. Non-zero chain 295 has an empty before set, meaning that there is no preference for any other code block chain to be after it, or in other words, no preference for code block chain 295 to be before any other code block chain. Non-zero chain 294 has non-zero chain 296 in its before set, meaning that it is preferred for non-zero chain 296 to come after non-zero chain 294, or in other words, it is preference that non-zero chain 294 come before non-zero chain 296. Thus by adding non-zero chain 294 to non-zero ordering 119, it increases the set of code block chains that should be after the sorted code block chains, whereas adding chain 295 does not increase the set.

When after set violations, connection counts, and the set of code block chains that should be after previously sorted chains is the same relative to all other unsorted code block chains, a next lower priority precedence relationship is given to the code block chain with the highest execution count. This relationship guarantees that all zero count code block chains are sorted after all non-zero count code block chains.

When after set violations, connection counts, the set of code block chains that should be after previously sorted code block chains is the same relative to previously sorted chains, and execution count is the same relative to all other unsorted code block chains, a next lower priority precedence relationship honors the lexical ordering of the initial block in each code block chain. That is, if code block 207 is before code block 210 in method 111, non-zero chain 295 is placed before non-zero chain 296. On the other hand, if code block 210 is before code block 207 in method 111, chain 296 is placed before chain 295. For purposes of completing this example, it is determined that code block 210 is before code block 207 in method 111. Thus, chain 296 is placed before chain 295.

The remaining non-zero chain, non-zero chain 295 is then placed after chain 296. Placement of non-zero chain 295 completes non-zero ordering 119 for method 111 (block graph 200). Any zero chains are then appended to non-zero ordering 119 following the same precedence relationships. For example, zero chain 297 is appended to non-zero chain 295 to create total ordering 118 for method 111 (block graph 200).

Total ordering 118 can be (potentially significantly) different than the ordering of code blocks of method 111 used during profiling. Total ordering 118 is optimized to place more frequently executed code blocks near the top of memory. Total ordering 118 is also optimized to group more frequently executed code blocks near each other in memory. Total ordering is also optimized to place zero count (untouched) code blocks after any non-zero (touched) code blocks. These optimizations facilitate memory utilization in a top down manner and mitigate the number of jumps between non contiguous portions of memory during execution resulting in more efficient execution of method 111.

Accordingly, embodiments of the invention utilize code block counts to provide code block layouts that improve execution time of generated procedure code by minimizing branches along more frequently executed paths. Embodiments can also take advantage of hardware branch prediction on remaining branches, which predicts that backwards branches are taken and forward branches are not taken. Embodiments also improve startup times for programs having increased disk input/output by decreasing the amount of unexecuted code that is read from disk.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including system memory, a method for optimizing the execution of a software procedure, the method comprising the acts of:
    accessing an executable procedure that includes a plurality of different code blocks each of which is instrumented to provide a count for each time the code block is executed during the procedure;
    generating a hierarchical block graph in which each block is linked to one or more preceding or following blocks based on the original executable order for performing the procedure using the code blocks, and each code block being identified in the hierarchy by its corresponding count;
    creating one or more code block chains, each chain comprising one or more code blocks for the executable procedure, each said chain being formed by:
        selecting, in order from highest count to lowest count, each code block in the plurality of code blocks and for each selected code block performing the steps of:
            when the selected each code block is either a predecessor or a successor to an existing chain, assigning the selected code block to the respective existing chain, otherwise, creating a new chain with the selected each code block;
    from all existing and created code block chains, identifying code block chains that contain code blocks having non-zero count blocks and chains that contain only code blocks having a zero count;
    generating a plurality of after sets, each after set indicating a preference that a specified code block chain comes after each code block chain in the each after set in a total ordering;
    generating a plurality of before sets, each before set indicating a preference that a specified code block chain comes before each code block chain in the each before set in a total ordering;
    based on the before and after sets, generating precedence relationships that are used to determine how to order the code block chains, with the result that code block chains containing code blocks with higher counts will be given a higher order for execution when executing the procedure than chains containing code blocks with lower counts; and
    ordering the one or more non-zero code block chains based on the precedence relationships, and then appending any zero-count code block chains at the end of the order, and then storing the ordered code block chains in system memory to optimize subsequent execution of the executable procedure.

2. The method as recited in claim 1, wherein creating one or more code block chains of one or more code blocks for the executable procedure comprises performing the following for one or more code block chains:
    an act of accessing a code block with the highest block count that is not already included in a code block chain; and
    for each accessed block:
    determining if the accessed code block is a successor to the last block in an existing code block chain;
    determining if the accessed code block is a predecessor to the first block in an existing code block chain; and
    assigning the accessed code block to the one or more code block chains based at least on the results of determining if the accessed code block is a successor to an existing code block chain and the results of determining if the accessed code block is a predecessor to an existing code block chain.

3. The method as recited in claim 1, further comprising an act of creating an ordering for any zero count code block chains including connecting any zero count code block chains to one another in accordance with precedence relationships.

4. The method as recited in claim 3, wherein the act of ordering zero code block chains comprises minimizing after set violations.

5. The method as recited in claim 3, wherein the act of ordering the one or more zero code block chains based on precedence relationships comprises:
    an act of determining that any of a plurality of the zero code block chains are subject to equivalent after set violations; and
    an act of ordering the any of a plurality of zero code block chains that are subject to equivalent after set violations by determining which of the zero code block chains that are subject to equivalent after set violations have the highest count of connections to previously ordered zero code block chains.

6. The method as recited in claim 1, wherein the act of ordering the one or more code block chains based on precedence relationships comprises:
   an act of determining that any of a plurality of non-zero code block chains are subject to equivalent after set violations; and
   an act of ordering the any of a plurality of non-zero code block chains that are subject to equivalent after set violations by determining which of the non-zero code block chains that are subject to equivalent after set violations have the highest count of connections to previously ordered non-zero code block chains.

7. The method as recited in claim 5, wherein the act of ordering the one or more code block chains based on precedence relationships comprises:
   an act of determining that any of a plurality of non-zero code block chains are subject to equivalent after set violations; and
   an act of ordering the any of a plurality of non-zero code block chains that are subject to equivalent after set violations by determining which of the non-zero code block chains that are subject to equivalent after set violations have the highest count of connections to previously ordered non-zero code block chains.

8. The method as recited in claim 1, wherein the act of ordering the one or more code block chains based on precedence relationships comprises ordering the one or more code block chains to minimize forward branches along more frequently executed paths in the executable hierarchy.

9. At a computer system, a method for optimizing the execution of a software procedure, the method comprising the acts of:
   accessing an executable procedure that includes a plurality of different code blocks each of which is instrumented to provide a count for each time the code block is executed during the procedure;
   generating a hierarchical block graph in which each block is linked to one or more preceding or following blocks based on the original executable order for performing the procedure using the code blocks, and each code block being identified in the hierarchy by its corresponding count, but otherwise the block count not affecting a block's position in the hierarchy;
   creating one or more code block chains, each chain comprising one or more code blocks for the executable procedure, each said chain being formed by:
   selecting, in order from highest count to lowest count, each code block in the plurality of code blocks and for each selected code block performing the steps of:
      when the selected each code block is either a predecessor or a successor to an existing chain, assigning the selected code block to the respective existing chain, otherwise, creating a new chain with the selected each code block;
   from all existing and created code block chains, identifying code block chains that contain code blocks having non-zero count blocks and chains that contain only code blocks having a zero count;
   generating a plurality of after sets, each after set indicating a preference that a specified code block chain comes after each code block chain in the each after set in a total ordering;
   generating a plurality of before sets, each before set indicating a preference that a specified code block chain comes before each code block chain in the each before set in a total ordering;
   based on the before and after sets, generating precedence relationships that are used to determine how to order the code block chains, with the result that code block chains containing code blocks with higher counts will be given a higher order for execution when executing the procedure than chains containing code blocks with lower counts;
   ordering the one or more non-zero code block chains based on the precedence relationships, but minimizing any after set violations by
   determining that any of a plurality of code block chains are subject to equivalent after set violations; and
   ordering the any of the plurality of code block chains that are subject to equivalent after set violations by determining which of the code block chains that are subject to equivalent after set violations have the highest count of connections to previously ordered code block chains; and
   appending any zero-count code block chains at the end of the order, and then storing the ordered code block chains in system memory to optimize subsequent execution of the executable procedure.

10. The method as recited in claim 1, wherein the act of ordering the one or more non-zero code block chains based on precedence relationships comprises:
   an act of determining that any of a plurality of code block chains not yet ordered have equivalent count connections to previously ordered code block chains; and
   an act ordering the any of the plurality of not yet ordered code block chains to maximize the set of code block chains that should be after previously ordered code block chains.

11. The method as recited in claim 9, wherein the act of ordering the one or more non-zero code block chains based on precedence relationships comprises ordering the one or more code block chains to minimize forward branches along more frequently executed paths in the executable hierarchy.

12. At a computer system including system memory, a computer-readable medium that stores computer-executable instructions for implementing a method for optimizing the execution of a software procedure, the method comprising the acts of:
   accessing an executable procedure that includes a plurality of different code blocks each of which is instrumented to provide a count for each time the code block is executed during the procedure;
   generating a hierarchical block graph in which each block is linked to one or more preceding or following blocks based on the original executable order for performing the procedure using the code blocks, and each code block being identified in the hierarchy by its corresponding count, but otherwise the block count not affecting a block's position in the hierarchy;
   creating one or more code block chains, each chain comprising one or more code blocks for the executable procedure, each said chain being formed by:
   selecting, in order from highest count to lowest count, each code block in the plurality of code blocks and for each selected code block performing the steps of:
      when the selected each code block is either a predecessor or a successor to an existing chain, assigning the selected code block to the respective existing chain, otherwise, creating a new chain with the selected each code block;

from all existing and created code block chains, identifying code block chains that contain code blocks having non-zero count blocks and chains that contain only code blocks having a zero count;

generating a plurality of after sets, each after set indicating a preference that a specified code block chain comes after each code block chain in the each after set in a total ordering;

generating a plurality of before sets, each before set indicating a preference that a specified code block chain comes before each code block chain in the each before set in a total ordering;

based on the before and after sets, generating precedence relationships that are used to determine how to order the code block chains, with the result that code block chains containing code blocks with higher counts will be given a higher order for execution when executing the procedure than chains containing code blocks with lower counts; and ordering the one or more non-zero code block chains based on the precedence relationships, and then appending any zero-count code block chains at the end of the order, and then storing the ordered code block chains in system memory to optimize subsequent execution of the executable procedure.

13. At a computer system, a computer-readable medium that stores computer-executable instructions for implementing a method for optimizing the execution of a software procedure, the method comprising the acts of:

accessing an executable procedure that includes a plurality of different code blocks each of which is instrumented to provide a count for each time the code block is executed during the procedure;

generating a hierarchical block graph in which each block is linked to one or more preceding or following blocks based on the original executable order for performing the procedure using the code blocks, and each code block being identified in the hierarchy by its corresponding count, but otherwise the block count not affecting a block's position in the hierarchy;

creating one or more code block chains, each chain comprising one or more code blocks for the executable procedure, each said chain being formed by:

selecting, in order from highest count to lowest count, each code block in the plurality of code blocks and for each selected code block performing the steps of:

when the selected each code block is either a predecessor or a successor to an existing chain, assigning the selected code block to the respective existing chain, otherwise, creating a new chain with the selected each code block;

from all existing and created code block chains, identifying code block chains that contain code blocks having non-zero count blocks and chains that contain only code blocks having a zero count;

generating a plurality of after sets, each after set indicating a preference that a specified code block chain comes after each code block chain in the each after set in a total ordering;

generating a plurality of before sets, each before set indicating a preference that a specified code block chain comes before each code block chain in the each before set in a total ordering;

based on the before and after sets, generating precedence relationships that are used to determine how to order the code block chains, with the result that code block chains containing code blocks with higher counts will be given a higher order for execution when executing the procedure than chains containing code blocks with lower counts;

ordering the one or more non-zero code block chains based on the precedence relationships, but minimizing any after set violations by determining that any of a plurality of code block chains are subject to equivalent after set violations; and ordering the any of the plurality of code block chains that are subject to equivalent after set violations by determining which of the code block chains that are subject to equivalent after set violations have the highest count of connections to previously ordered code block chains; and appending any zero-count code block chains at the end of the order, and then storing the ordered code block chains in system memory to optimize subsequent execution of the executable procedure.

* * * * *